Patented Aug. 31, 1937

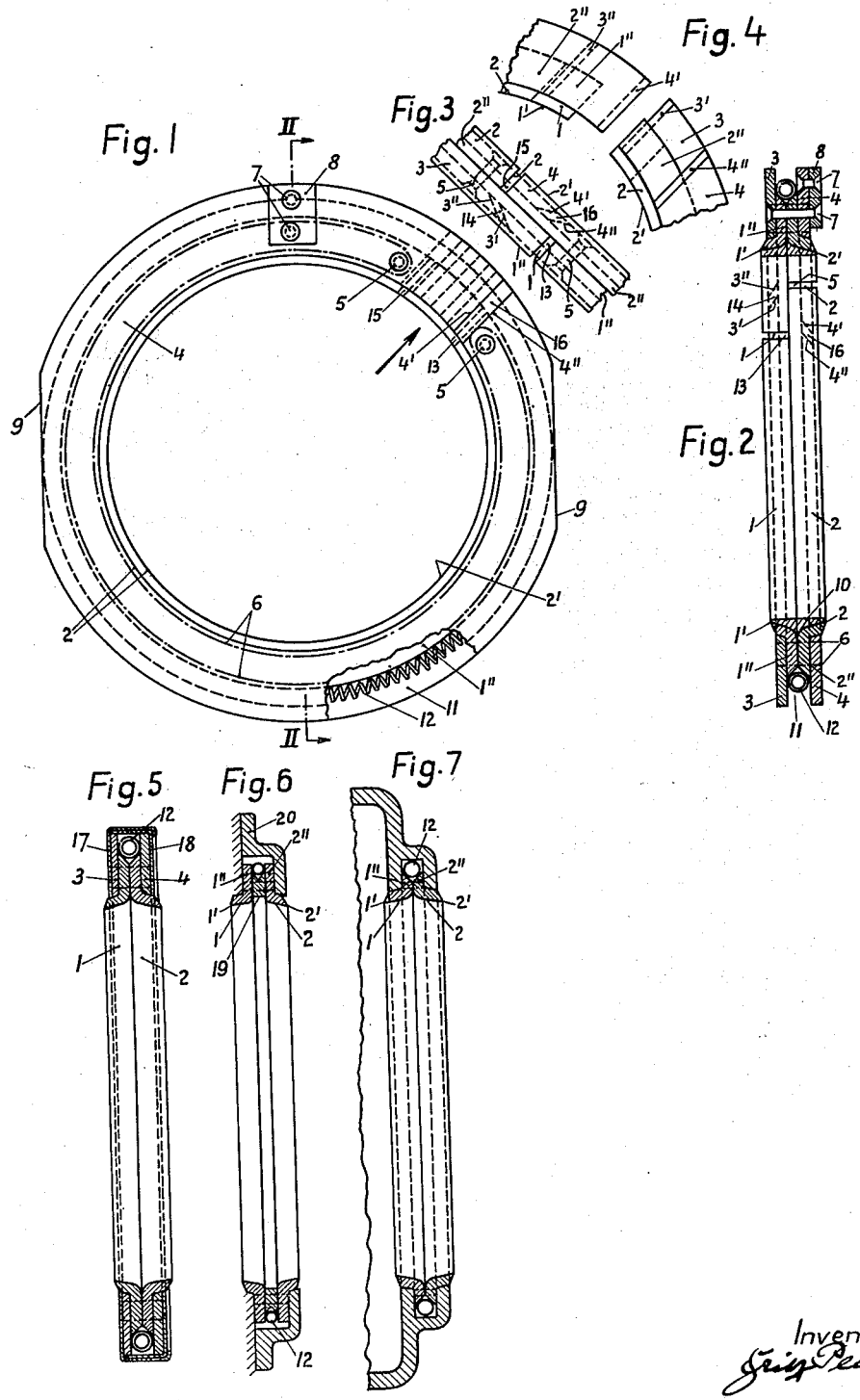

2,091,739

UNITED STATES PATENT OFFICE

2,091,739

OIL AND DUST PACKING FOR ROTATING AXLES AND SHAFTS

Fritz Pesarese, Grundschottel, Germany, assignor to firm: Eisen-u. Stahlwerk Walter Peyinghaus, Egge, Germany Application September 26, 1935, Serial No. 42,327
In Germany October 1, 1934

7 Claims. (Cl. 286—5)

In oil and dust packing for rotating axles and shafts, and particularly in axle bearings of railway vehicles, the packing member bearing directly against the axle or shaft and consisting of resilient material has already been constructed in the form of a sleeve. As, however, the advantageous actions of such sleeves in repelling foreign bodies only takes place on one side, the known arrangements are not satisfactory since there is the possibility of the formation of an oildust mixture between the sleeve and the machine part to be packed, whereby the packing will be strongly attacked and destroyed in a short time.

These disadvantages of the known arrangements are eliminated according to the present invention in that the packing comprises two sleeves of resilient material which are arranged parallel to one another and are subjected to a radially-directed packing pressure, the two end faces of the sleeves each being provided with a packing edge. Such an arrangement obviates the possibility of the formation of emery-like masses due to the co-mingling oil and dust particles, since one sleeve has an oil-repelling action and the other sleeve a dust-repelling action. This action may be amplified in that the diameter of the sleeve openings at the plane of contact of the two sleeves can be greater than the openings at the ends of the sleeves. In this manner, the natural elasticity of the resilient material of which the sleeves are formed becomes effective so that the packing edges at the end faces of the sleeves bear with a certain amount of pre-tension against the machine part to be packed. In addition, there is also the possibility of filling the hollow space thus formed between the two sleeves with lubricating and packing means so that, for example, the flexibility of the sleeve material is maintained for a long time. Leather is preferably selected as the material for the sleeves.

The ring-like steps or parts of the preferably L-shaped sleeves are located in places at right angles to the axis of rotation and if they are reinforced by lateral rings it is particularly simple to accommodate and secure the packing in a carrier. In connection with the casing of axle bearings the carrier may consist of a so-called dust-pocket, which may be formed as an integral part of the casing or as a separate dust-pocket cap. It will be understood, however, that the carrier may also be constructed in any other manner.

The said lateral rings preferably overlap the said annular steps or parts of the sleeves located at right angles to the axis of rotation, so as to form a groove in which a spiral spring, adapted to apply pressure to the packing, may be accommodated. In this manner, there is obtained an entirely uniform radially-directed packing pressure on the entire bearing surfaces of the packing in the machine part to be packed.

The sleeves and the associated lateral rings may be slit open in the radial direction, the abutting joints being displaced relatively to each other and the joints in the sleeves being displaced relatively to those in the lateral rings. In this manner, the formation of open spaces at any variations in the diameter of the machine part to be packed, which are liable to occur in practice, are obviated.

The accompanying drawing shows, by way of example, various constructional forms of the present invention.

Fig. 1 is an end view of a packing constructed according to the invention;

Fig. 2 is a vertical longitudinal section of the packing on the line II—II in Fig. 1;

Fig. 3 is a view of the abutting parts of the packing looking in the direction of the arrow in Fig. 1;

Fig. 4 is an end view of the abutting parts in the opened-out position of the packing;

Figs. 5 to 7 show further constructional forms of the invention.

In Figs. 1 to 4, 1 and 2 indicate two leather sleeves which are arranged parallel to one another and are subjected to radially-directed packing pressure, their end faces being respectively provided with packing edges $1^1$ and $2^1$. In this construction, the leathers bear with the natural skin against the axle or shaft, not shown, to be packed. The two L-shaped sleeves are provided at $1^{11}$ and $2^{11}$ with annular parts or steps, which are arranged at right angles to the axis of rotation and through which the sleeves are connected to reinforcing lateral rings 3 and 4. If the reinforcing rings are also of leather, when the natural skin is located at the face end surfaces, the parts 1 to 4 may be connected by copper rivets, as shown at 5, or (in order to economize in copper) of a cobbler's thread seam 6 or both, whilst, in this construction, the copper rivets 5 are also provided solely in the vicinity of the abutting parts of the packing. A parallelepiped metal member 8 is riveted at 7 to one of the reinforcing rings and engages in a corresponding recess in the carrier for the packing and thus eliminates any possibility of the packing turning. For the same purpose, the packing may also be suitably flattened as shown, for example, at 9. As clearly shown in Fig. 2, the diameters of the openings in the sleeves on the plane of contact of the sleeves are greater than at the sleeve ends $1^1$, $2^1$, so that the natural elasticity of the leather there comes into play, the packing edges $1^1$ and $2^1$ bearing with a certain pre-tension against the machine part to be packed. This leads to an efficient packing closure at the various diameters of the said machine part to be packed. The hollow space formed between the two leather sleeves and the surface of the machine part to be packed can be filled with lubricating or packing means 10 so that flexibility, especially of the leather sleeves, is maintained over a longer period. The lateral rings 3, 4 which reinforce the annular parts or steps $1^{11}$, $2^{11}$, overlaps the latter as particularly shown in Fig. 2 and also provide an annular groove 11 in which a spiral spring 12 can be accommodated. In combination with the abutting parts, which will be described hereinafter, the spiral spring ensures that the sleeves will be subjected to a uniform radially-directed packing pressure, which is distributed uniformly over the periphery of the machine part to be packed.

The abutting parts are formed by slitting open the packing on one side. As will be seen in Figs. 1, 3, and 4 the abutting edges of the sleeves and of the associated lateral rings are displaced relatively to each other and to those of the sleeves or rings, as the case may be. Thus, for example, the joint in the sleeve 1, $1^{11}$ is located at 13 (see Fig. 3) but the joint in the associated reinforcing ring 3 is, however, located at 14. In contrast, the joint in the sleeve 2, $2^{11}$ is located at 15, whereas the joint in the associated reinforcing ring 4 is located at 16. The planes in which the limiting ends $3^1$, $3^{11}$, and $4^1$, $4^{11}$ of the two reinforcing rings are located in this case are inclined to the axis of rotation, so that a further security against the passage of foreign bodies is provided for at the abutting parts. As shown in Fig. 3, the part of the lateral ring 4 leading to the limiting end $4^1$ covers the separating joint 15 in the sleeve 2, $2^{11}$, at any variation in diameter. Similarly, the separating joint 13 in the sleeve 1, $1^1$ is covered by the part of the lateral ring 3 leading to the limiting end 3. On the other hand, the sleeve 2, $2^{11}$, as shown particularly in the lower half of Fig. 4, prevents the separating joint located between the limiting ends $4^1$, $4^{11}$ of the lateral ring extending through to the other end surface. The same remarks apply to the sleeve 1, $1^{11}$, relatively to the separating joint between the limiting ends $3^1$, $3^{11}$ of the lateral ring 3, as shown at the upper half of Fig. 4.

The packing described above eliminates the possibility of the formation of emery-like masses by the co-mingling oil and dust particles, because one of the sleeves acts to repel the oil and the other sleeve to repel the dust. Each of the edges $1^1$ and $2^1$ bears tightly against the machine part to be packed with a certain pre-tension which is produced partly by the natural elasticity of the leather, that can exert itself in consequence of the formation of the hollow space 10 and partly by the uniform pressure applied by the spiral spring 12. By the provision of substances which prevent the passage of lubricant between the sleeves 1 and 2 on the one hand and the reinforcing rings 3 and 4 on the other hand, the latter can be maintained in their original stiff condition so that by the bearing of the end faces of the side rings 3 and 4 against the walls of the carrier an effective packing closure is obtained in this vicinity. In contrast with known arrangements the packing not only has the advantage of a packing closure which is present on every side, at which foreign bodies could enter, but it also satisfies all requirements as regards commercial utility, since the sleeves can be produced from comparatively inexpensive rolled leather strips, whilst the lateral rings which reinforce the sleeves may be composed of a number of pieces whereby there is a possibility of using leather waste.

Figs. 5 to 10 show further constructional forms of the invention. Thus, the construction shown in Fig. 5 corresponds substantially with the packing shown in Figs. 1 to 4, the only difference being that the packing is enclosed on each side by a metal strip 17, 18 bent at right angles and thus constitutes a completed constructional unit.

Fig. 6 shows the arrangement of the packing in a packing-housing or pocket of the bearing casing formed by a cap 20. In order to hold together and to reinforce the sleeves 1, 2 there is provided a reinforcing ring 19 which is located between the sleeves and which also serves to transmit the pressure of the spiral spring to the packing surfaces. At the place of contact of the surfaces of the annular steps $1^{11}$, $2^{11}$ of the sleeves 1, 2 with the intermediate ring 19, the diameter of the sleeves is again somewhat larger than at the packing edges $1^1$, $2^1$, so that the above mentioned desired hollow space is obtained.

Fig. 7 shows a construction with a packing housing or pocket cast on the bearing casing. The spiral spring 12 acts directly on the sleeves 1, 2 which are sufficiently guided in the walls of the packing housing.

Numerous departures may be made from the constructions shown without departing from the scope of the invention.

Having now particularly described and ascertained the nature of my said invention and in what manner the same is to be performed, I declare that what I claim is:—

1. An oil and dust packing means for rotating axles and shafts, comprising a plurality of flexible radially slitted packing sleeves, each sleeve having a flange portion and an axially extending portion, said flange portions being placed back to back whereby the axially extending portions will extend in opposite directions, a pair of radially slitted clamping rings engageable with the flange portions of the sleeves, and annular spring means engaging said flange portions of said sleeves for applying radial pressure on said sleeves, the joints formed at the slits in the sleeves being displaced circumferentially relatively to each other and the joints in the rings being displaced circumferentially relatively to each other, and the joints in the sleeves being displaced relatively to those in the rings.

2. An oil and dust packing means for rotating axles and shafts, comprising a plurality of flexible radially slitted packing sleeves, each sleeve having a flange portion and an axially extending portion, said flange portions being placed back to back whereby the axially extending portions will extend in opposite directions, a pair of radially slitted clamping rings engageable with the flange portions of the sleeves and overlapping said portions to form a groove, and annular spring means arranged in said groove and engaging said flange portions for applying radial pressure on said sleeves, the joints formed at the slits in the sleeves being displaced relatively to each other and the joints in the rings being displaced circumferentially relatively to each other, and the joints in the sleeves being displaced relatively to those in the rings.

3. An oil dust packing means for axles or shafts rotating in a bearing housing, comprising in combination two angular resilient sleeves, said sleeves arranged against each other with the members at right angles to the axis of the shaft, the other angular members of said sleeves each enclosing an acute angle with the radial central plane of said sleeves, a recess in said bearing housing for receiving the packing adapted to permit movements of the packing at right angles to the axis of the shaft due to movements in space of the axle or shaft, the members of the sleeve extending at right angles to the axle or shaft being arranged closely against the walls of the recess in the bearing housing for receiving the packing, said sleeves being slitted and overlapping at the slitted part, springs adapted to draw together the ends of the resilient packing which are moved through the medium of the slitted part in a peripheral direction, the axle or shaft being closely surrounded.

4. An oil and dust packing according to claim 3, the space between the surface of the axle or shaft and the acute angles with the radial plane by members enclosing the packing being filled with lubricating or packing means.

5. An oil and dust packing according to claim 3, in which there are resilient reinforcing rings which bear against the lateral boundary surfaces of the members of the sleeve extending at right angles to the axis of the shaft, said reinforcing rings bearing simultaneously against the walls of the recess in the bearing housing for receiving the packing, said reinforcing rings being rigidly secured to that sleeve against which they bear.

6. An oil and dust packing according to claim 3, in which there are resilient reinforcing rings which bear against the lateral boundary surfaces of the members of the sleeve extending at right angles to the axis of the shaft, said reinforcing rings being slitted and bearing simultaneously against the walls of the recess in the bearing housing for receiving the packing, said reinforcing rings being rigidly secured to that sleeve against which they bear, the slitted part being displaced peripherally relative to the slit of the sleeve against which the reinforcing ring bears.

7. An oil dust packing means for axles or shafts rotating in a bearing housing, comprising in combination two angular resilient sleeves, said sleeves arranged against each other with the members at right angles to the axis of the shaft, the other angular members of said sleeves each enclosing an acute angle with the radial central plane of said sleeves, a recess in said bearing housing for receiving the packing adapted to permit movements of the packing at right angles to the axis of the shaft due to movements in space of the axle or shaft, the members of the sleeve extending at right angles to the axle or shaft being arranged closely against the walls of the recess in the bearing housing for receiving the packing, said sleeves consisting of packing strips overlapping at their ends, springs adapted to draw together the ends of the resilient packing which are moved through the medium of the slitted parts in a peripheral direction, the axle or shaft being closely surrounded.

FRITZ PESARESE.